United States Patent
Lee et al.

(10) Patent No.: US 8,610,845 B2
(45) Date of Patent: Dec. 17, 2013

(54) DISPLAY DEVICE HAVING COLOR FILTER AND POLYMER-DISPERSED LIQUID CRYSTAL (PDLC) LAYER

(75) Inventors: Gae-hwang Lee, Hwaseong-si (KR); Jae-eun Jang, Seoul (KR); Jae-eun Jung, Seoul (KR); Kyu-young Hwang, Ansan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 182 days.

(21) Appl. No.: 13/224,637

(22) Filed: Sep. 2, 2011

(65) Prior Publication Data
US 2012/0113360 A1    May 10, 2012

(30) Foreign Application Priority Data
Nov. 10, 2010   (KR) .................. 10-2010-0111566

(51) Int. Cl.
G02F 1/1333   (2006.01)
G02F 1/1335   (2006.01)
G02F 1/136    (2006.01)

(52) U.S. Cl.
USPC .............................. 349/86; 349/106; 349/44

(58) Field of Classification Search
USPC ............................................ 349/86, 106, 44
See application file for complete search history.

(56) References Cited

U.S. PATENT DOCUMENTS

| 4,876,165 A | * | 10/1989 | Brewer et al. ............... 430/7 |
| 6,162,654 A | | 12/2000 | Kawabe |
| 6,661,485 B2 | * | 12/2003 | Moon ........................... 349/113 |
| 2009/0244441 A1 | * | 10/2009 | Nagato et al. ................ 349/78 |

FOREIGN PATENT DOCUMENTS

| EP | 0750211 A1 | * | 12/1996 |
| JP | 04248519 | | 9/1992 |
| JP | 11133391 A | | 5/1999 |
| KR | 19960015033 | | 5/1996 |
| KR | 20020018088 A | | 3/2002 |
| KR | 100393389 | | 7/2003 |
| KR | 10-2007-0002187 A | | 1/2007 |

OTHER PUBLICATIONS

European Search Report dated Nov. 21, 2012 issued in European Application No. 11188267.
Den Boer, et al., *Active Matrix Liquid Crystal Displays—Fundamentals and Applications*, Elsevier, Inc. (© 2005).

* cited by examiner

*Primary Examiner* — Mike Qi
(74) *Attorney, Agent, or Firm* — Harness, Dickey & Pierce, P.L.C.

(57) ABSTRACT

A display device may include a first substrate, a second substrate, reflective plates and a transparent electrode. The first substrate and the second substrate may be facing each other. The reflective plates may be on a surface of the first substrate facing the second substrate. The transparent electrode may be disposed on a surface of the second substrate facing the first substrate. Color filters and a polymer-dispersed liquid crystal (PDLC) layer may further be included in the display device. The color filters may be on the reflective plates, and the PDLC may be between the first substrate and the second substrate. The PDLC layer may include a polymer and liquid crystals dispersed in the polymer.

29 Claims, 3 Drawing Sheets

DISPLAY DEVICE HAVING COLOR FILTER AND POLYMER-DISPERSED LIQUID CRYSTAL (PDLC) LAYER

CROSS-REFERENCE TO RELATED APPLICATIONS

This application claims priority under 35 U.S.C. 119 to Korean Patent Application No. 10-2010-0111566, filed on Nov. 10, 2010, in the Korean Intellectual Property Office, the entire contents of which is incorporated herein by reference.

BACKGROUND

1. Field

Example embodiments relate to color display devices including color filters.

2. Description of the Related Art

Polymer-dispersed liquid crystal (PDLC) may scatter or transmit incident light by adjusting the difference between a refractive index of the liquid crystal and a refractive index of the polymer neighboring the liquid crystal. Accordingly, a PDLC may be employed in a reflective display device in order to display information and/or an image with light provided by an external light source. A color filter may be further equipped to the reflective color display device having a PDLC for color display.

When the UV curing light is arranged to pass through a second substrate on which the thin film transistors (TFT) are disposed, the presence of the TFT on the second substrate which may be placed on the other side of the PDLC may create a dead zone(s). A polymer of the PDLC in the dead zone(s) of the PDLC may not be fully cured by the UV light. The presence of the polymer which is not fully cured in the PDLC can cause various disadvantages, for example, reducing the sensitivity of the liquid crystals to an electric field, increasing a driving voltage and lowering a scattering coefficient, thereby reducing the visibility of the images on the display device.

SUMMARY

Example embodiments provide display devices having color filters on a substrate on which light is not incident. Additional aspects will be set forth in part in the description which follows and, in part, will be apparent from the description, or may be learned by practice of example embodiments.

According to example embodiments, a display device may include a first substrate, a second substrate spaced from the first substrate, the second substrate located above the first substrate in a vertical direction from a cross-sectional view, a plurality of color filters and a plurality of transistors on a surface of the first substrate facing the second substrate, and a polymer-dispersed liquid crystal (PDLC) layer between the first substrate and the second substrate, the PDLC layer including a polymer and liquid crystals dispersed in the polymer.

A plurality of reflective plates and a transparent electrode may be between the surface of the first substrate facing the second substrate and the second substrate. The plurality of transistors may be electrically connected to the plurality of reflective plates. The transparent electrode may be on a surface of the second substrate. The transparent electrode may be formed of an indium tin oxide (ITO).

A light-absorbing layer may be between the PDLC layer and the surface of the first substrate facing the second substrate. A plurality of reflective plates may be covered by the light-absorbing layer. The light-absorbing layer may be between the plurality of color filters and the plurality of reflective plates. The light-absorbing layer may include a plurality of holes therein. The light-absorbing layer may be on the plurality of color filters. The light-absorbing layer may be a metal oxide material, or formed of a polymer including a black dye. The light-absorbing layer may have a thickness in a range from about 10 nm to about 5 μm.

The plurality of color filters may be red, green and blue color filters corresponding to subpixels. The plurality of color filters may be yellow, magenta and cyan color filters corresponding to subpixels. A plurality of reflective plates may be between the surface of the first substrate facing the second substrate and a surface of the second substrate facing the first substrate, the plurality of reflective plates formed of at least one of aluminum and molybdenum.

According to example embodiments, a display device may include a first substrate, a second substrate spaced apart from the first substrate, the second substrate located above the first substrate in a vertical direction from a cross-sectional view a transparent electrode on the second substrate, a polymer-dispersed liquid crystal (PDLC) layer between the first substrate and the second substrate, the PDLC layer including a polymer and liquid crystals, and a color filter and a light-absorbing layer on a surface of the first substrate facing the second substrate, the light-absorbing layer between the PDLC layer and the first substrate.

A transistor and a reflective plate may be on the first substrate, the reflective plate electrically connected to the transistor. The transparent electrode may be formed of an indium tin oxide (ITO). The light-absorbing layer may be a metal oxide material and adjacent to the color filter. The light-absorbing layer may include a plurality of holes therein.

According to example embodiments, a color display device may include a first substrate, a second substrate spaced apart from the first substrate, the second substrate located above the first substrate in a vertical direction from a cross-sectional view, a plurality, of reflective plates and a plurality of transistors on a surface of the first substrate facing the second substrate, a plurality of color filters on the plurality of reflective plates, and a polymer-dispersed liquid crystal (PDLC) layer between the first substrate and the second substrate, the PDLC layer including a polymer and liquid crystals dispersed in the polymer, wherein a refractive index of each of the liquid crystals is changed by an electric field formed by a supplied voltage.

The plurality of transistors and the plurality of reflective plates may be electrically connected. A transparent electrode may be on the second substrate, the transparent electrode formed of an indium tin oxide (ITO). A light-absorbing layer may be between the PDLC layer and the surface of the first substrate facing the second substrate. The light-absorbing layer may be between the plurality of color filters and the plurality of reflective plates. The light-absorbing layer may be on the plurality of color filters. The light-absorbing layer may include a plurality of holes formed therein. The light-absorbing layer may be a metal oxide material, or formed of a polymer including a black dye. The light-absorbing layer may have a thickness in a range from about 10 nm to about 5 μm.

BRIEF DESCRIPTION OF THE DRAWINGS

The foregoing and other aspects, objects, features and advantages of example embodiments will become apparent and more readily appreciated from the following description of example embodiments, taken in conjunction with the accompanying drawings of which.

DETAILED DESCRIPTION

Figure 1:
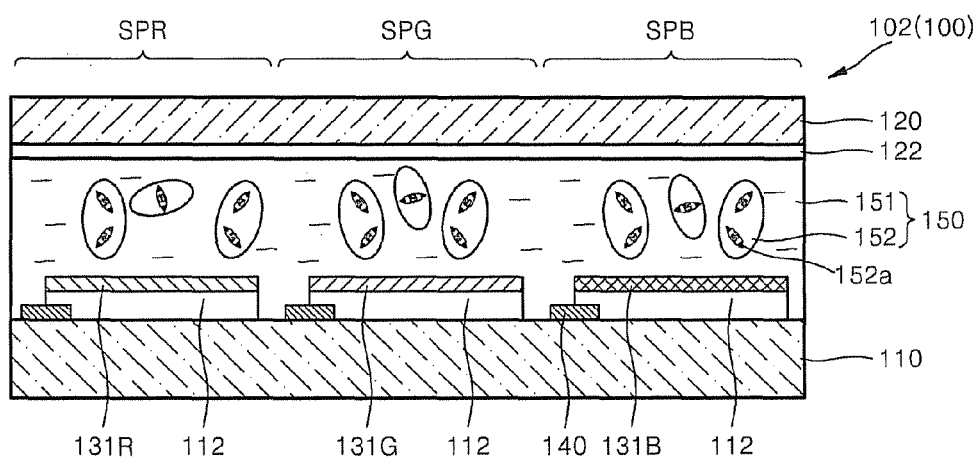
FIG. 1 is a cross-sectional, schematic view of a color display device having a color filter, according to example embodiments.

Various example embodiments will now be described more fully with reference to the accompanying drawings in which some example embodiments are shown. However, specific structural and functional details disclosed herein are merely representative for purposes of describing example embodiments. Thus, example embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various aspects will be described in detail with reference to the attached drawings. However, example embodiments are not limited thereto.

FIG. 1 is a cross-sectional, schematic view of a color display device 100 having a color filter, according to example embodiments. Referring to FIG. 1, the color filter display device 100 may include a plurality of pixel units 102, and each of the pixel units 102 may include subpixels SPR, SPG, and SPB having given colors. The SPR, SPG, and SPB may represent a red subpixel, a green subpixel, and a blue subpixel, respectively. However, the SPR, SPG, and SPB are not limited to the red, green, and blue subpixels, and they may be a cyan subpixel, a magenta subpixel, and a yellow subpixel respectively.

According to example embodiments shown in FIG. 1, the color display device 100 may include a first substrate 110 and a second substrate 120 spaced apart from each other and disposed in parallel. The color display device may further include reflective plates 112 and a transparent electrode 122 facing each other. The reflective plates 112 may be formed on a surface of the first substrate 110, and the transparent electrode 122 may be formed on a surface of the second substrate 120.

Referring to FIG. 1, the reflective plates 112 may be disposed corresponding to the subpixels SPR, SPG, and SPB, and spaced apart from one another. Each of the reflective plates 112 may be a flat plate with a mirror surface that specularly reflects incident light. The reflective plate 112 may be formed of a metal, for example aluminum, molybdenum or the like, and may function as an electrode for a voltage supply. The transparent electrode 122 may be a common electrode having a flat plate shape. The transparent electrode 122 may be formed of an indium tin oxide (ITO).

In FIG. 1, the first substrate 110 may be disposed as a lower substrate and the second substrate 120 may be disposed as an upper substrate. The first and second substrates 110, 120 may be transparent, and formed of a transparent material (e.g. glass and/or plastic).

According to example embodiments of FIG. 1, color filters 131R, 131G, and 131B may be formed on the reflective plates 112. The color filters 131R, 131O, and 131B may selectively transmit only red, green, and blue light, respectively. Each of the color filters 131R, 131O, and 131B may be a non-scattering filter which may be formed by mixing a polymer with a dye for a corresponding color.

In FIG. 1, the color filters 131R, 131G, and 131B may be respectively a red filter, a green filter, and a blue filter, which are disposed in order for corresponding to the subpixels SPR, SPG, and SPB respectively. The color filters 131R, 131O, and 131B are not limited to red, green and blue color filters, and they may be yellow, magenta, and cyan color filters corresponding to the subpixels SPR, SPG, and SPB.

According to example embodiments of FIG. 1, a polymer-dispersed liquid crystal (PDLC) layer 150 may be disposed between the first substrate 110 and the second substrate 120. Thin film transistors (TFT) 140 may be positioned on the first substrate 110. The thin film transistors 140 may be electrically connected to the reflective plates 112 and act as an electrode. Each of the thin film transistors 140 may be disposed with respect to a corresponding reflective plate 112, as shown in FIG. 1, and may switch the corresponding reflective plate 112 which is electrically connected thereto. The thin film transistors 140 may be arranged in an array form.

Referring to FIG. 1, the PDLC layer 150 may include a polymer layer 151 and liquid crystals 152 dispersed in the polymer layer 151. Each liquid crystal 152 may include a plurality of liquid crystal molecules 152*a*. For convenience, there are only one or two liquid crystal molecules 152*a* shown in the liquid crystal 152. In the PDLC layer 150, light can be scattered or transmitted by adjusting a difference between a refractive index of the polymer layer 151 and a reflective index of the liquid crystals 152. The liquid crystals 152 may not include a dye.

According to example embodiments of FIG. 1, the reflective plates 112, the color filters 131R, 131G, and 131B, and the thin film transistors 140 may be disposed on a surface of the first substrate 110 which is facing the second substrate 120. Therefore, incident light passes through the second substrate 120, and the PDLC layer 150 before reaching the reflective plates 112, the color filters 131R, 131G, and 131B, and/or the thin film transistors 140.

Figure 2:
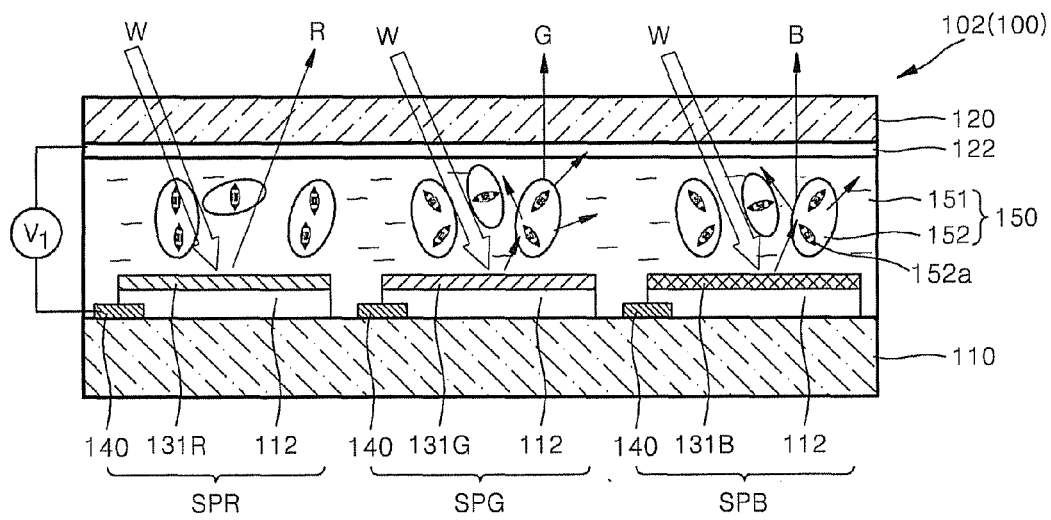
FIG. 2 is a schematic view illustrating an operation mechanism in the color display device of FIG. 1.

FIG. 2 is a schematic view illustrating an operation mechanism of the color display device 100 according to example embodiments shown in FIG. 1. Referring to FIG. 2, a given voltage may be applied between the reflective plates 112 through the thin film transistor 140 and the common electrode 122. For example, when a first voltage V1 is applied between the reflective plate 112 of the red subpixel SPR and the common electrode 122, liquid crystal molecules 152*a* of the liquid crystals 152 (which are positioned within an electric field formed by the common electrode 122 and the reflective plate 112 of the red subpixel SPR) may be aligned in parallel to the electric field. With the alignment of the liquid crystal molecules 152*a*, a refractive index of the liquid crystals 152 may be changed and become about the same with a refractive index of the polymer layer 151. Therefore, a region of the PDLC layer 150 corresponding to the red subpixel SPR becomes transparent. Referring to FIG. 2, external white light W with an incident angle may enter through a surface of the color display device 100.

Due to the alignment of the liquid crystal molecules 152*a*, the white light W may pass through the region of the PDLC layer 150 corresponding to the red subpixel SPR and then reach on the red color filter 131R. In the color filter 131R, only a red light component of the white light W may pass through the red color filter 131R. The red light component may be specularly reflected by the reflective plate 112 and proceed at an angle corresponding to the incident angle of the white light W. The reflected red light component may pass through the region of the PDLC layer 150 corresponding to the red subpixel SPR without scattering.

The reflected red light component may further pass through the second substrate 120, and provide a red light at the angle. Because the external white light W and the reflected red light component may be specularly reflected by the reflective plate 112 and proceed at the angle without experiencing scattering, as shown in FIG. 2, there may be no red light reflected and emitted in a direction for the viewer which may be perpendicular to the reflective plate 112. Therefore, the red subpixel SPR applied with the first voltage V1 may be recognized as black to the viewer.

On the other hand, liquid crystal molecules 152*a* of the liquid crystal 152 located in other regions corresponding to the green subpixel SPG and the blue subpixel SPB may not be aligned and arranged irregularly because there is no voltage supply. Accordingly, a refractive index of the liquid crystals 152 positioned in the regions corresponding to the green subpixel SPG and blue subpixel SPB may be sufficiently different from the refractive index of the polymer layer 151 to cause scattering. In the green and blue subpixels SPG and SPB, external white light W may be scattered by the irregularly arranged liquid crystal molecules 152*a* and transmitted through the PDLC layer 150, and reach the green and blue color filters 131G and 131B.

In the color filters, only green and blue light components of the white light W may respectively pass through the green and blue color filters 131G and 131B, and may be reflected by the corresponding reflective plate 112. The reflected green and blue lights may be further scattered, as shown in FIG. 2, by the irregularly arranged liquid crystal molecules 152*a* in the regions of the PDLC layer 150 corresponding to the green and blue subpixels SPG and SPB without voltage supply. Referring to FIG. 2, the green and blue light components may be scattered into various angles in the PDLC layer 150, and provide green and blue lights after passing through the second substrate 120. Therefore, the green light from the green subpixel SPG and the blue light from the blue subpixel SPB may be observed at various angles including the direction for the viewer which is perpendicular to the reflective plates 112.

According to example embodiments as shown in FIG. 2, a subpixel with a voltage supply (e.g. the red subpixel SPR in FIG. 2) may be recognized as a black color, and a subpixel with no voltage supply (e.g. the green subpixel SPG or the blue subpixel SPB in FIG. 2) may be recognized as the color of the subpixel (e.g., the color of the color filter in the subpixel).

Because the color of each of the subpixels (e.g. red, green, and blue subpixels SPR, SPG, and SPB) in the pixel units 102 may be adjusted by controlling the power supply (e.g. voltage), various colors can be displayed by the pixel units 102.

According to example embodiments as shown in FIGS. 1 and 2, ultraviolet (UV) light may be irradiated to the PDLC layer 150 through the second substrate 120, and the PDLC layer 150 may be cured with less energy than in a related art. The UV radiation through the second substrate 120 may further improve curing characteristics in the PDLC layer 150, and thus, the quality of the images on the color display device 100 may be improved as well.

Figure 3:
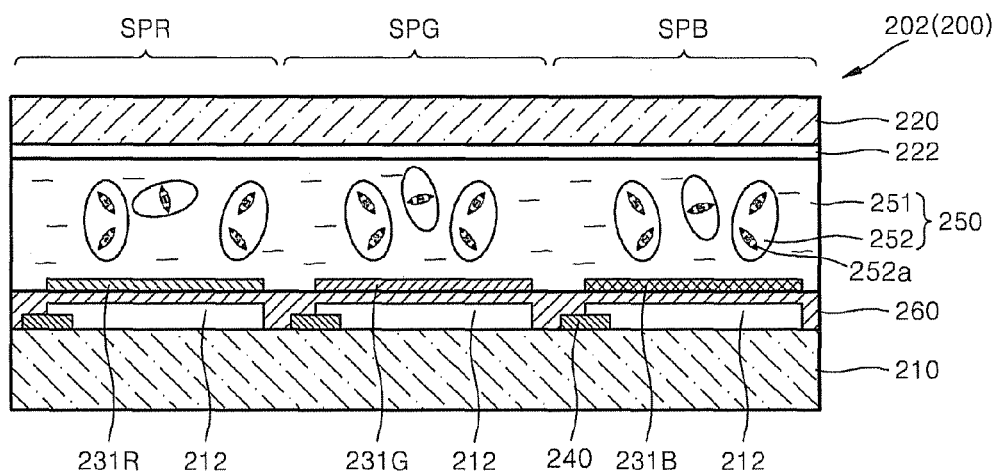
FIG. 3 is a cross-sectional, schematic view of a color display device having a color filter, according to example embodiments.

FIG. 3 is a cross-sectional, schematic view of a color display device 200 having a color filter, according to example embodiments. The following explanation focuses on a difference between the example embodiments shown in FIGS. 1 and 2 and other example embodiments shown in FIGS. 3 through 5. Referring to FIG. 3, the color display device 200 may include a plurality of pixel units 202, and each of the pixel units 202 may include subpixels SPR, SPG, and SPB having given colors. For example, the subpixels SPR, SPG, and SPB may be red, green, and blue subpixels, respectively.

According to example embodiments as shown in FIG. 3, the color display device 200 may include first and second substrates 210 and 220 spaced apart from each other and in parallel. In the color display device 200, reflective plates 212 may be formed on a surface of the first substrate 210, and a transparent electrode 222 may be formed on a surface of the second substrate 220. The reflective plate 212 and the transparent electrode 222 may be disposed to face each other.

Referring to FIG. 3, the reflective plates 212 may be disposed corresponding to the subpixels SPR, SPG, and SPB, and spaced apart from one another. Each of the reflective plates 212 may be formed of a metal (e.g. aluminum or molybdenum) and specularly reflect incident light. In addition, the reflective plates 212 may act as a flat electrode. The transparent electrode 222 may be a common electrode having a flat plate shape.

In FIG. 3, the first substrate 210 which is disposed as a lower substrate and the second substrate 220 which is disposed as an upper substrate may be transparent. A light-absorbing layer 260 may be disposed between a PDLC layer 250 and the first substrate 210, and may cover the reflective plates 212. The light-absorbing layer 260 may be formed of a polymer including a black dye. The light-absorbing layer 260 may be disposed on the reflective plates 212 and have a thickness in a range from about 10 nm to about 5 μm. If the thickness of the light-absorbing layer 260 is less than 10 nm, the effect of the light-absorbing layer may be reduced. If the thickness of the light-absorbing layer 260 is greater than 5 μm, the operating voltage of the device may be undesirably increased.

According to example embodiments, the light-absorbing layer 260 may be a metal oxide film. For example, the reflective plates 212 may be formed of aluminum, and the light-absorbing layer 260 may be an alumina film formed on a surface of the reflective plates 212 through oxidation process.

Color filters 231R, 231G, and 231B may be formed on the light-absorbing layer 260, which may be disposed over the reflective plates 212 corresponding to red, green, and blue subpixels SPR, SPG, and SPB respectively.

Referring to FIG. 3, the PDLC layer 250 may be disposed between the first substrate 210 and the second substrate 220. Thin film transistors 240 may be disposed on the first substrate 210. The thin film transistors 240 may be electrically connected to the reflective plates 212 and act as an electrode. Each of the thin film transistors 240 may be disposed with respect to a corresponding reflective plate 212, as shown in FIG. 3, and may switch the corresponding reflective plates 212 which are electrically connected thereto.

In FIG. 3, the PDLC layer 250 may include a polymer layer 251 and liquid crystals 252 dispersed in the polymer layer 251. Each liquid crystal 252 may include a plurality of liquid crystal molecules 252a. For convenience, there are only one or two liquid crystal molecules 252a shown in the liquid crystal 252. In the PDLC layer 250, light can be scattered or transmitted by adjusting a difference between a refractive index of the polymer layer 251 and a reflective index of the liquid crystals 252. The liquid crystals 252 may not include a dye.

With regard to the color display device 100 of FIG. 1, ambient light may be reflected and undesirably observed by the viewer at a certain angle. In example embodiments, an undesirable reflectance of ambient light in a subpixel to which a voltage is applied may be higher than a reflectance of light from a subpixel (located at the front) without a voltage supply, which is called reflectance inversion phenomenon. The undesirable reflection of ambient light may reduce light visibility. However, the presence of the light-absorbing layer 260 in the color display device 200 may reduce the intensity of the undesirable reflection of ambient light, and thereby may suppress the reflection inversion phenomenon and improve light visibility.

Because an operation mechanism of the color display device 200 of FIG. 3 is similar to the operation mechanism of the color display device 100 of FIG. 1 except the role of the light-absorbing layer 260 which is clearly described above, the detailed description of the operation mechanism in the color display device 200 will be omitted here.

Figure 4:
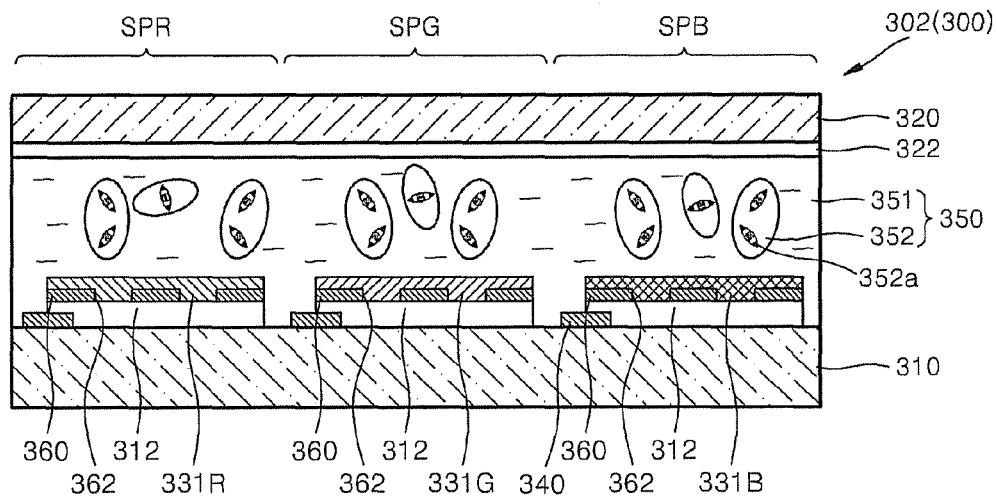
FIG. 4 is a cross-sectional, schematic view of a color display device having a color filter, according to example embodiments.

FIG. 4 is a cross-sectional, schematic view of a color display device 300 having a color filter, according to example embodiments. Referring to FIG. 4, the color display device 300 may include a plurality of pixel units 302, and each of the pixel units 302 may include subpixels SPR, SPG, and SPB with given colors. For example, the subpixels SPR, SPG, and SPB may be red, green, and blue subpixels, respectively.

According to example embodiments shown in FIG. 4, the color display device 300 may include first and second substrates 310 and 320 spaced apart from each other and in parallel. In the color display device 300, reflective plates 312 may be formed on a surface of the first substrate 310, and a transparent electrode 322 may be formed on a surface of the second substrate 320. The reflective plates 312 and the transparent electrode may be disposed to face each other. Referring to FIG. 4, the reflective plates 312 may be spaced apart from one another and disposed according to the subpixels SPR, SPG, and SPB respectively. Each of the reflective plates 312 may be formed of a metal (e.g. aluminum or molybdenum) and specularly reflect incident light. In addition, the reflective plates 312 may act as a flat electrode. The transparent electrode 322 may be a common electrode having a flat plate shape.

Referring to FIG. 4, the first substrate 310 which is disposed as a lower substrate and the second substrate 320 which is disposed as an upper substrate may be transparent.

A light-absorbing layer 360 may be disposed on the reflective plates 312. A plurality of holes 362 may be formed in the light-absorbing layer 360. The light-absorbing layer 360 may be formed of a polymer including a black dye. The light-absorbing layer 360 may have a thickness in a range from about 10 nm to about 5 μm. The holes 362 formed in the light-absorbing layer 360 may have various shapes, for example, a circular shape, rectangular shape and/or a triangle shape. According to example embodiments as shown in FIG. 4, the level of absorbance of the light-absorbing layer 360 can be adjusted by controlling the shape, size and/or number of holes 362. Therefore, the presence of the holes 362 with the desired shape, size and number may improve light visibility in the color display device and may minimize or reduce an increase in a driving voltage due to the formation of the light-absorbing layer 360.

Color filters 331R, 331G, and 331B may be formed on the light-absorbing layer 360, which may be disposed on the reflective plates 312. Referring to FIG. 4, the color filters 331R, 331G, and 331B may be disposed over the reflective plates 312 corresponding to red, green, and blue subpixels SPR, SPG, and SPB, respectively.

A PDLC layer 350 may be disposed between the first substrate 310 and the second substrate 320. In addition, thin film transistors 340 may be disposed on the first substrate 310. The thin film transistors 340 may be electrically connected to the reflective plates 312. Each of the thin film transistors 340 may switch a corresponding reflective plate 312 to which each of the thin film transistor 340 is electrically connected.

Referring to FIG. 4, the PDLC layer 350 may include a polymer layer 351 and liquid crystals 352 dispersed in the polymer layer 351. Each liquid crystal 352 may include a plurality of liquid crystal molecules 352a. For convenience, there are only one or two liquid crystal molecules 352a shown in the liquid crystal 352. In the PDLC layer 350, light may be scattered or transmitted by adjusting a difference between a refractive index of the polymer layer 351 and a reflective index of the liquid crystals 352. The liquid crystals 352 may not include a dye.

Figure 5:
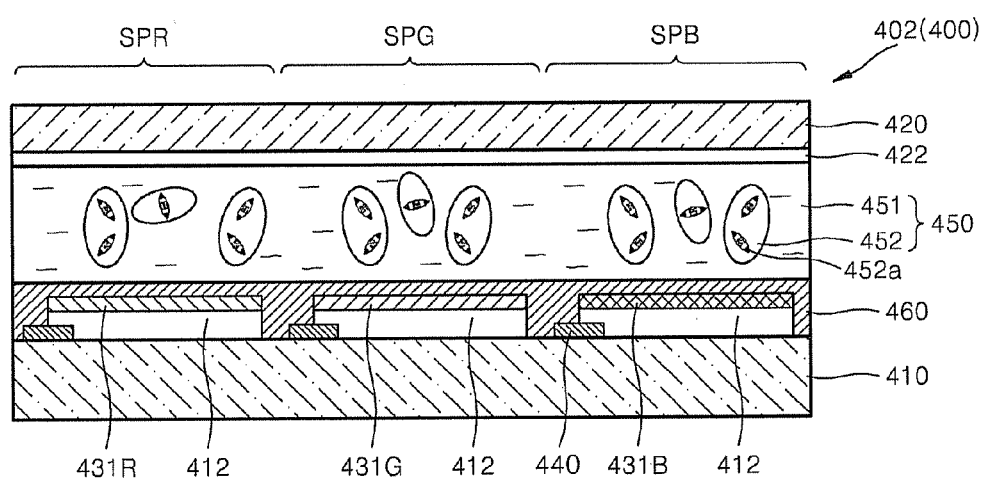
FIG. 5 is a cross-sectional, schematic view of a color display device having a color filter, according to example embodiments.

FIG. 5 is a cross-sectional, schematic view of a color display device 400 having a color filter, according to example embodiments. Referring to FIG. 5, the color display device 400 may include a plurality of pixel units 402, and each of the pixel units 402 may include subpixels SPR, SPG, and SPB of given colors. For example, the subpixels SPR, SPG, and SPB may be red, green, and blue subpixels, respectively.

According to example embodiments of FIG. 5, the color display device 400 may include first and second substrates 410 and 420 spaced apart from each other and being in parallel. In the color display device 400, reflective plates 412 may be formed on a surface of the first substrate 410, and a transparent electrode 422 may be formed on a surface of the second substrate 420. The reflective plate 412 and the transparent electrode 422 may be disposed to face each other. Referring to FIG. 5, the reflective plates 412 may be spaced apart from one another and disposed according to the subpixels SPR, SPG, and SPB respectively. Each of the reflective plates 412 may be formed of a metal (e.g. aluminum or molybdenum) and reflect incident light. The transparent electrode 422 may be a common electrode having a flat plate shape.

In FIG. 5, the first substrate 410 which is disposed as a lower substrate and the second substrate 420 which is disposed as an upper substrate may be transparent. Color filters 431R, 431G, and 431B may be disposed on the reflective plates 412. The color filters 431R, 431G, and 431B may selectively transmit only red, green, and blue light, respectively.

Referring to FIG. 5, a light-absorbing layer 460 may be disposed on the color filters 431R, 431G, and 431B and may cover a surface of the first substrate 410. The light-absorbing layer 460 may be formed of a polymer including a black dye. The light-absorbing layer 460 formed on the color filters 431R, 431G, and 431B may have a thickness in a range from about 10 nm to about 5 μm.

A plurality of holes (not shown) which are similar to the holes in the light-absorbing layer 360 of FIG. 4 may be formed in the light-absorbing layer 460. An operation mechanism of the light-absorbing layer 460 may be very similar to the operation mechanism of the light-absorbing layer 360 shown in FIG. 4. Therefore, a detailed description of the operation mechanism in the color display device 400 will be omitted here.

A PDLC layer 450 may be disposed between the first substrate 410 and the second substrate 420. In addition, thin film transistors 440 may be disposed as an array on the first substrate 410. The thin film transistors 440 may be electrically connected to the reflective plates 412. Each of the thin film transistors 440 may switch a corresponding reflective plate 412 to which each of the thin film transistor 440 is electrically connected.

Referring to FIG. 5, the PDLC layer 450 may include a polymer layer 451 and liquid crystals 452 dispersed in the polymer layer 451. Each liquid crystal 452 may include a plurality of liquid crystal molecules 452a. For convenience, there are only one or two liquid crystal molecules 452a shown in the liquid crystal 452. In the PDLC layer 450, light may be scattered or transmitted by adjusting a difference between a refractive index of the polymer layer 451 and a reflective index of the liquid crystals 452. The liquid crystals 452 may not include a dye.

The display device of example embodiments may be employed in a variety of electronic devices. For example, the display device may be employed in electronic paper (e-paper) apparatuses, flexible display devices, and reflective display devices.

According to example embodiments, color filters and an array of thin film transistors may be disposed on a substrate, and thus UV light may be provided to a PDLC layer through another substrate without any optical interaction with the color filters or the array of the thin film transistor before reaching the PDLC layer during a manufacturing process. Therefore, the PDLC layer may be cured with less energy while improving curing characteristics in the PDLC layer and thus light visibility in a color display device.

In addition, the presence of a light-absorbing layer may prevent or reduce reflectance inversion phenomenon between subpixels and further improve the light visibility.

While example embodiments have been described, it should be apparent that modifications and variations thereto are possible, all of which fall within the true spirit and scope of example embodiments. With respect to the above description then, it is to be realized that the optimum relationships for the components and steps of example embodiments, including variations in order, form, content, function and manner of operation, are deemed readily apparent and obvious to one skilled in the art, and all equivalent relationships to those illustrated in the drawings and described in the specification are intended to be encompassed by example embodiments. The above description and drawings are illustrative of modifications that can be made without departing from example embodiments, the scope of which is to be limited only by the following claims.

Therefore, the foregoing is considered as illustrative only of the principles of example embodiments. Further, because numerous modifications and changes will readily occur to those skilled in the art, it is not desired to limit example embodiments to the exact construction and operation shown and described, and accordingly, all suitable modifications and equivalent are intended to fall within the scope of example embodiments as claimed.

What is claimed is:

1. A display device comprising:
   a first substrate;
   a second substrate spaced from the first substrate, the second substrate located above the first substrate in a vertical direction from a cross-sectional view;
   a plurality of color filters and a plurality of transistors on a surface of the first substrate facing the second substrate;
   a polymer-dispersed liquid crystal (PDLC) layer between the first substrate and the second substrate, the PDLC layer including a polymer and liquid crystals dispersed in the polymer; and
   a light-absorbing layer between the PDLC layer and the surface of the first substrate facing the second substrate.

2. The display device of claim 1, further comprising:
   a plurality of reflective plates and a transparent electrode between the surface of the first substrate facing the second substrate and the second substrate.

3. The display device of claim 2, wherein the plurality of transistors are electrically connected to the plurality of reflective plates.

4. The display device of claim 2, wherein the transparent electrode is on a surface of the second substrate.

5. The display device of claim 4, wherein the transparent electrode is formed of an indium tin oxide (ITO).

6. The display device of claim 1, further comprising:
   a plurality of reflective plates covered by the light-absorbing layer.

7. The display device of claim 6, wherein the light-absorbing layer is between the plurality of color filters and the plurality of reflective plates.

8. The display device of claim 1, wherein the light-absorbing layer includes a plurality of holes therein.

9. The display device of claim 1, wherein the light-absorbing layer is on the plurality of color filters.

10. The display device of claim 1, wherein the light-absorbing layer is a metal oxide material.

11. The display device of claim 1, wherein the light-absorbing layer is formed of a polymer including a black dye.

12. The display device of claim 1, wherein the light-absorbing layer has a thickness in a range from about 10 μm to about 5 μm.

13. The display device of claim 1, wherein the plurality of color filters are red, green and blue color filters corresponding to subpixels.

14. The display device of claim 1, wherein the plurality of color filters are yellow, magenta and cyan color filters corresponding to subpixels.

15. The display device of claim 1, further comprising:
   a plurality of reflective plates between the surface of the first substrate facing the second substrate and a surface of the second substrate facing the first substrate, the plurality of reflective plates formed of at least one of aluminum and molybdenum.

16. A display device comprising:
   a first substrate;
   a second substrate spaced apart from the first substrate, the second substrate located above the first substrate in a vertical direction from a cross-sectional view;
   a transparent electrode on the second substrate;
   a polymer-dispersed liquid crystal (PDLC) layer between the first substrate and the second substrate, the PDLC layer including a polymer and liquid crystals; and
   a color filter and a light-absorbing layer on a surface of the first substrate facing the second substrate, the light-absorbing layer between the PDLC layer and the first substrate.

17. The display device of claim 16, further comprising:
   a transistor and a reflective plate on the first substrate, the reflective plate electrically connected to the transistor.

18. The display device of claim 16, wherein the transparent electrode is formed of an indium tin oxide (ITO).

19. The display device of claim 16, wherein the light-absorbing layer is a metal oxide material and adjacent to the color filter.

20. The display device of claim 16, wherein the light-absorbing layer includes a plurality of holes therein.

21. A color display device comprising:
   a first substrate;
   a second substrate spaced apart from the first substrate, the second substrate located above the first substrate in a vertical direction from a cross-sectional view;
   a plurality of reflective plates and a plurality of transistors on a surface of the first substrate facing the second substrate;
   a plurality of color filters on the plurality of reflective plates;
   a polymer-dispersed liquid crystal (PDLC) layer between the first substrate and the second substrate, the PDLC layer including a polymer and liquid crystals dispersed in the polymer; and
   a light-absorbing layer between the PDLC layer and the surface of the first substrate facing the second substrate,
   wherein a refractive index of each of the liquid crystals is changed by an electric field formed by a supplied voltage.

22. The color display device of claim 21, wherein the plurality of transistors and the plurality of reflective plates are electrically connected.

23. The color display device of claim 21, further comprising:
   a transparent electrode on the second substrate, the transparent electrode formed of an indium tin oxide (ITO).

24. The color display device of claim 21, wherein the light-absorbing layer is between the plurality of color filters and the plurality of reflective plates.

25. The color display device of claim 21, wherein the light-absorbing layer is on the plurality of color filters.

26. The color display device of claim 21, wherein the light-absorbing layer includes a plurality of holes formed therein.

27. The color display device of claim 21, wherein the light-absorbing layer is a metal oxide material.

28. The color display device of claim 21, wherein the light-absorbing layer is formed of a polymer including a black dye.

29. The display device of claim 21, wherein the light-absorbing layer has a thickness in a range from about 10 μm to about 5 μm.